(12) United States Patent
Hayashi

(10) Patent No.: US 6,948,180 B2
(45) Date of Patent: Sep. 20, 2005

(54) DISK CARTRIDGE WHICH ACCOMMODATES AN INFORMATION-RECORDING DISK

(75) Inventor: Shiro Hayashi, Moriya (JP)

(73) Assignee: Hitachi Maxell, Ltd., Ibaraki (JP)

( * ) Notice: Subject to any disclaimer, the term of this patent is extended or adjusted under 35 U.S.C. 154(b) by 158 days.

(21) Appl. No.: 10/617,209

(22) Filed: Jul. 11, 2003

(65) Prior Publication Data

US 2004/0013082 A1 Jan. 22, 2004

(30) Foreign Application Priority Data

Jul. 15, 2002 (JP) ........................................ 2002-205413

(51) Int. Cl.⁷ ............................................. G11B 23/03
(52) U.S. Cl. ................................................... 720/728
(58) Field of Search ................................... 720/728, 730, 720/734, 725, 719, 718, 735; 369/291.1; 360/133

(56) References Cited

U.S. PATENT DOCUMENTS

2002/0185393 A1 * 12/2002 Taguchi et al. .......... 206/308.1
2004/0107432 A1 *  6/2004 Berkson et al. ............. 720/728

FOREIGN PATENT DOCUMENTS

| JP | 08-249852 | 9/1996 |
| JP | A 10-50023 | 2/1998 |
| JP | 10-079185 | 3/1998 |
| JP | 11-066794 | 3/1999 |
| JP | 11-328905 | 11/1999 |
| JP | 2000-156059 | 6/2000 |
| JP | 2000-260153 | 9/2000 |

OTHER PUBLICATIONS

U.S. Appl. No. 60/428,151.*

* cited by examiner

*Primary Examiner*—Julie Anne Watko
(74) *Attorney, Agent, or Firm*—Oliff & Berridge, PLC

(57) ABSTRACT

A disk cartridge, which is compact, which requires a small number of parts, and which is easily assembled, is provided. The disk cartridge of the present invention comprises an upper case and a lower case. Each of the upper case and the lower case is formed to be substantially circular. The upper case and the lower case define a disk-accommodating section when the lower case and the lower case overlap with each other. The disk cartridge is opened/closed by rotating the upper case relative to the lower case about a base point of a movable section which is provided for the upper case and/or the lower case. An information-recording disk is accommodated and removed in a state in which the disk cartridge is open. The disk cartridge further comprises an engaging section for engaging the upper case and the lower case with each other and an opening for exposing a central portion and an information-recording surface of the information-recording disk, the opening being formed at least on surfaces of the upper case and the lower case.

20 Claims, 7 Drawing Sheets

US 6,948,180 B2

DISK CARTRIDGE WHICH ACCOMMODATES AN INFORMATION-RECORDING DISK

BACKGROUND OF THE INVENTION

1. Field of the Invention

The present invention relates to a disk cartridge for accommodating a disk-shaped information-recording medium such as DVD and MO. In particular, the present invention relates to a disk cartridge which is compact and which makes it easy to insert and remove a disk.

2. Description of the Related Art

As shown in FIG. 7, a disk cartridge 200, which has been hitherto used for the information-recording medium such as DVD, comprises a disk holder 101 for holding a disk 102 and a cartridge case 100 for accommodating the disk holder 101. The cartridge case 100 is a case having a thin thickness with a substantially square surface, and it is principally composed of an upper case and a lower case. Each of the upper case and the lower case is a formed product made of synthetic resin. An internal space is formed by overlapping the upper case and the lower case with each other. An opening 106 is provided on one of side surfaces of the cartridge case 100. The disk holder 101, which holds the disk 102, is inserted in the direction of the arrow AR7 from the opening 106, and thus the disk 102 is accommodated in the disk cartridge 200. An opening 103 is provided on one of the surfaces of the cartridge case 100 (for example, on the upper case). Further, a slidable shutter 104 is provided to cover the opening 103. When the disk cartridge, which accommodates the disk 102, is inserted into an information-recording/reproducing apparatus, a predetermined portion of the information-recording/reproducing apparatus allows the shutter 104 to slide in the direction perpendicular to AR7 to open the opening 103 so that an information-recording/reproducing surface of the disk 102 accommodated in the disk cartridge 200 is exposed. Accordingly, a recording and reproducing head of the information-recording/reproducing apparatus is accessible with respect to the information-recording surface of the disk 102.

However, the disk cartridge having the structure as shown in FIG. 7 has an area which is about 1.6 times the area of the circular plate-shaped disk. The useless space has been consumed in the information-recording/reproducing apparatus in order to accommodate the disk cartridge. The useless space has been one of the factors to obstruct the miniaturization and lower the degree of freedom of the design of the information-recording/reproducing apparatus itself. Further, the conventional disk cartridge has involved such problems that the structure is complicated and the number of parts is increased, because the disk is held by the disk holder. Due to such problems, the production cost of the disk cartridge has been expensive, and it has been inconvenient to accommodate or remove the disk.

SUMMARY OF THE INVENTION

Thus, an object of the present invention is to provide a disk cartridge which is compact, which requires a small number of parts, and which is easily assembled.

According to a first aspect of the present invention, there is provided a disk cartridge which accommodates an information-recording disk, the disk cartridge comprising:

an upper case which has a first engaging section;

a lower case which has a second engaging section engageable with the first engaging section and which defines a disk-accommodating section when the lower case overlaps with the upper case; and a movable section which is provided for the upper case and/or the lower case and which rotates the upper case relative to the lower case, wherein:

each of the upper case and the lower case is formed to be substantially circular while having at least a pair of parallel flat sections disposed at opposing positions on an outer circumference; and an opening is provided on at least one of surfaces of the upper case and the lower case.

The disk cartridge of the present invention is constructed by the upper case and the lower case. The upper case and the lower case are formed to be substantially circular respectively. Therefore, the surface area of the disk cartridge is decreased, and it is possible to miniaturize the disk cartridge. Accordingly, it is possible to reduce the dead space of the recording and reproducing apparatus for the information-recording disk. Further, at least the pair of parallel flat sections are formed at the opposing positions on the outer circumference of the disk cartridge. The flat sections can be used as guides when the disk cartridge is inserted into the information-recording/reproducing apparatus. Further, the disk-accommodating section is defined by overlapping the upper case and the lower case with each other. The disk cartridge is opened/closed by rotating the upper case relative to the lower case about the base point of the movable section which is provided for the upper case and/or the lower case. The information-recording disk is accommodated and removed in the state in which the disk cartridge is open. The disk cartridge of the present invention is provided with the first and second engaging sections (for example, a fastening section and an elastic tab engageable therewith) in order to engage the upper case and the lower case with each other. Accordingly, the closed state of the disk cartridge is maintained. The opening, which is formed to expose the information-recording surface and the central portion of the information-recording disk provided with a spindle hole, is provided on at least one surface of the upper case and the lower case. The spindle, which rotates the disk, is inserted through the opening, and the recording and reproducing head makes the access with respect to the information-recording surface of the disk.

It is desirable that at least one of the upper case and the lower case has a plurality of ribs which surround the disk and which are formed by substantially concentric cylindrical surfaces, and the first engaging section and the second engaging section are formed outside the ribs. Accordingly, for example, when the engaging section composed of an elastic member is used, it is possible to avoid any influence which would be otherwise exerted by the elastic deformation thereof on the disk accommodated in the disk cartridge. The first engaging section and the second engaging section are preferably provided on the same plane as an outer circumferential surface of the disk cartridge, or inside the outer circumferential surface. Accordingly, the disk cartridge is prevented from being caught by any part when it is inserted into the information-recording/reproducing apparatus, and thus it is possible to smoothly insert and remove the disk cartridge.

In the disk cartridge of the present invention, it is desirable that the first engaging section and the second engaging section are provided on a side opposite to the movable section in relation to a center of the disk cartridge. Further, it is desirable that two pairs of first engaging sections and second engaging sections are provided. Further, it is desirable that the two pairs of the first engaging sections and the second engaging sections are provided substantially symmetrical to a line which passes through the center of the disk cartridge and the movable section. Accordingly, it is possible to more reliably maintain the state in which the disk cartridge is closed.

In the disk cartridge of the present invention, it is desirable that the opening is open so that an information-recording surface and a central portion of the information-recording disk are exposed. Further, it is desirable that the disk cartridge further comprises a bridge which is provided at an end of each of the upper case and the lower case on a side on which the opening is formed. Accordingly, the disk cartridge is reinforced against the decrease in rigidity of the case which would be otherwise caused by the opening provided for each of the cases. Further, it is desirable that the bridge is formed to have a thickness which is thinner than a thickness of the disk cartridge. Accordingly, it is possible to uniquely determine the direction in which the disk cartridge is inserted into the information-recording/reproducing apparatus, and it is possible to prevent the disk cartridge from any erroneous insertion.

In the present invention, the upper case, the lower case, and the movable section may be formed by integrated formation. When the disk cartridge is manufactured by means of the integrated formation, then it is possible to further decrease the number of parts, and it is possible to simplify the production and assembling steps.

According to a second aspect of the present invention, there is provided a disk cartridge which accommodates an information-recording disk and which is inserted into an information-recording/reproducing apparatus to record and/or reproduce information, the disk cartridge comprising:

an upper case and a lower case each of which has an opening for inserting a spindle and a head of the information-recording/reproducing apparatus, the opening being formed over a region ranging from a central portion of the disk cartridge to an end of the disk cartridge, wherein:

the upper case and the lower case are openable/closable by a hinge with engaging sections for maintaining a closed state being provided at least at two positions on a side opposite to the hinge as viewed from a center of the disk cartridge; and end portions which are defined by the opening and which are disposed at an end of the disk cartridge are connected by a bridge.

The disk cartridge according to each of the aspects described above may further include the information-recording disk accommodated therein. The disk cartridge of the present invention is provided singly as the disk cartridge or in a form in which the information-recording disk is accommodated in the disk cartridge.

BRIEF DESCRIPTION OF THE DRAWINGS

FIG. 5B shows a magnified view illustrating a portion A" shown in FIG. 5A.

DESCRIPTION OF THE PREFERRED EMBODIMENTS

An embodiment of the present invention will be explained with reference to the drawings. However, the present invention is not limited thereto.

Structure of Disk Cartridge

Figure 1A:
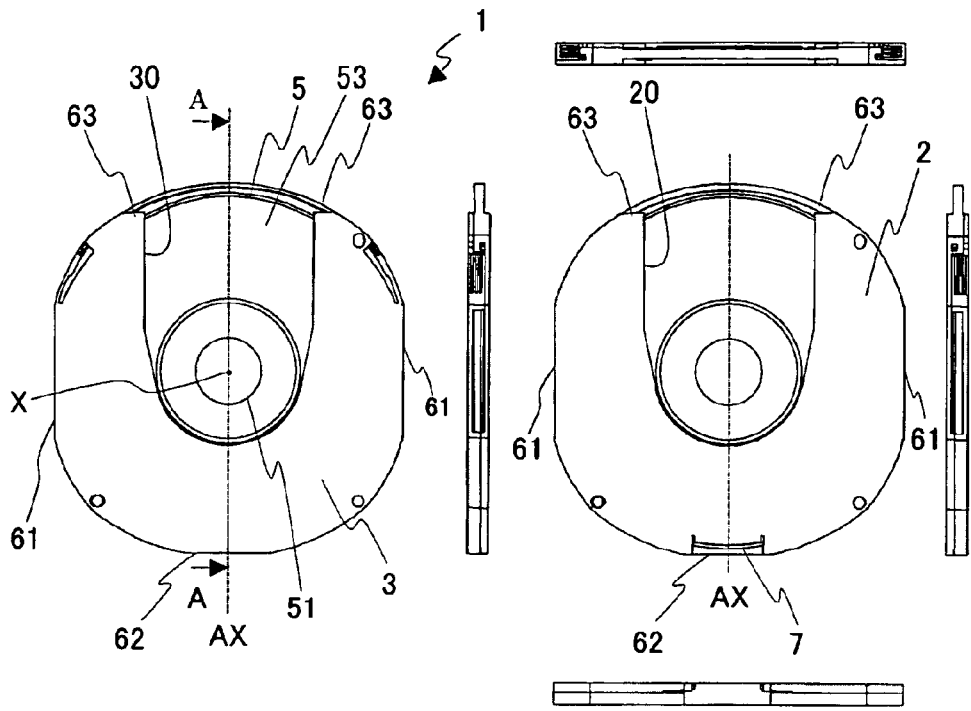
FIG. 1A shows top, bottom, front, back, right side, and left side views illustrating a disk cartridge according to an embodiment of the present invention.

FIG. 1A shows top, bottom, front, back, right side, and left side views illustrating a disk cartridge 1 in a state in which a disk is accommodated according to the present invention. The disk cartridge 1 is a circular plate-shaped case, and it is constructed by an upper case 2 and a lower case 3. The disk 5 is accommodated in the space which is formed by overlapping and combining the upper case 2 and the lower case 3. Each of the upper case 2 and the lower case 3 is composed of a formed product of synthetic resin, for example, polycarbonate, which is substantially circular with a plurality of circular arcs having radii of 40 to 55 mm. The upper case 2 and the lower case 3 are formed to have shapes which are substantially identical with each other. Flat sections 61, which are opposed to one another and which extend in parallel, are formed at outer circumferential portions of the upper case 2 and the lower case 3 respectively. For the convenience of explanation, a plane, which passes through the central position X of the cartridge 1 and which is parallel to the flat sections 61, is defined as "central plane AX". The disk 5 is an information-recording medium having an outer diameter of 80 mm, an inner diameter (diameter of spindle hole) of 15 mm, and a thickness of 1.2 mm. An information-recording surface is formed in an area of radii of 24 mm to 38 mm.

Figure 2A:
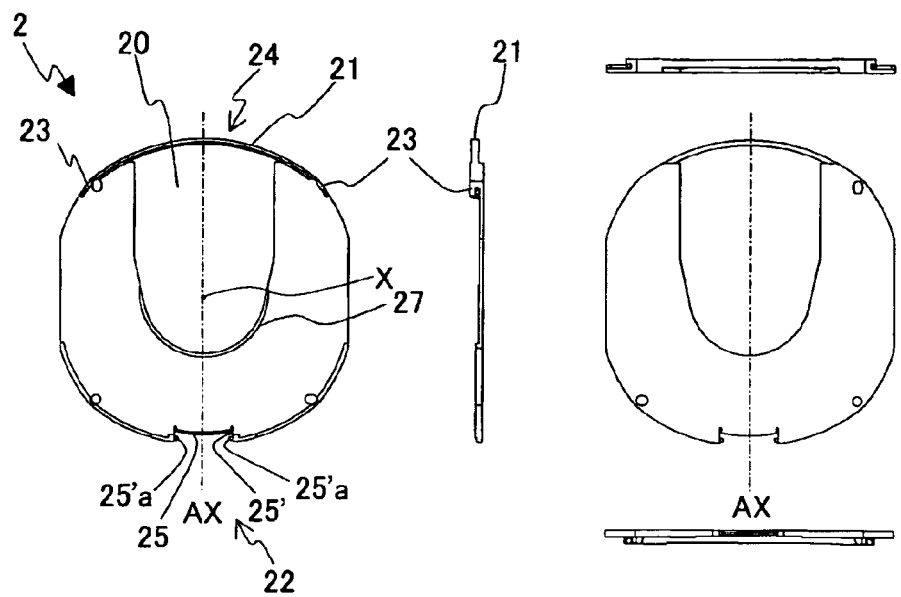
FIG. 2A shows top, bottom, front, back, and side views illustrating an upper case for constructing the disk cartridge shown in FIG. 1.
Figure 2B:
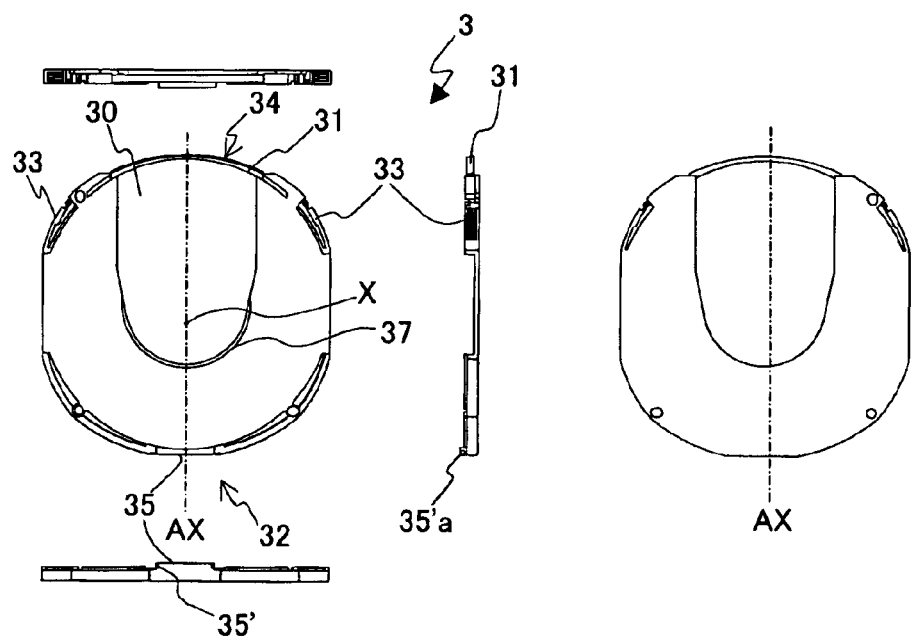
FIG. 2B shows a lower case for constructing the disk cartridge shown in FIG. 1.

Next, an explanation will be made with reference to FIG. 2 about details of the upper case 2 and the lower case 3. As shown in FIG. 2A, the upper case 2 has a recess (cutout) 25 which is formed at one end 22 in the central plane AX and which is indented in a rectangular form toward the center X of the upper case 2. Pins 25'a are formed to protrude on mutually opposing side walls 25' which define the recess 25. As shown in FIG. 2B, the lower case 3 has a portion which is provided at one end 32 in the central plane AX and which is formed to be flat over a predetermined length so as to be perpendicular to the central plane AX. A projection 35 is formed at the end 32 in a direction which is directed in the thickness direction (perpendicular to the plane of paper) of the lower case 3 and which is directed in the direction to make the engagement with the upper case 2. Holes 35'a, into which the pins 25'a of the upper case 2 are insertable, are formed on both side walls 35' of the projection 35. When the pins 25'a are fitted into the holes 35'a, the pins 25'a and the holes 35'a form a hinge (movable section) 7 of the disk cartridge 1 as shown in FIG. 1A. The disk cartridge 1 is opened/closed in accordance with the relative rotation of the upper case 2 and the lower case 3 about the rotary shaft of the hinge 7.

As shown in FIGS. 1A and 2, openings 20, 30 are provided on the surfaces of the upper case 2 and the lower case 3. Each of the openings 20, 30 is composed of a semicircular portion which is formed about the center X of each of the cases, and a rectangular portion which extends from the semicircular portion to arrive at the other end 24, 34 in the central plane AX. The disk 5, which is accommodated in the cartridge 1, has a spindle hole 51 and an information-recording surface 53 which are exposed through the openings 20, 30. Bridges 21, 31, each of which extends in the circumferential direction, are formed at the other ends 24, 34. The bridges 21, 31 compart the openings 20, 30, and they reinforce the disk cartridge provided with the openings 20, 30 having relatively large areas so that the rigidity of the disk cartridge is not lowered.

Figure 1B:
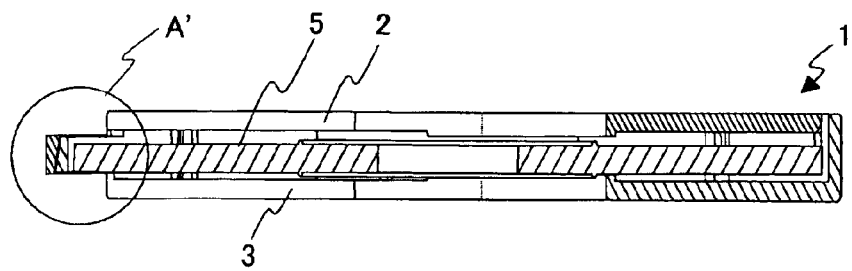
FIG. 1B shows a sectional view taken along a line A—A shown in FIG. 1A illustrating the disk cartridge.
Figure 1C:
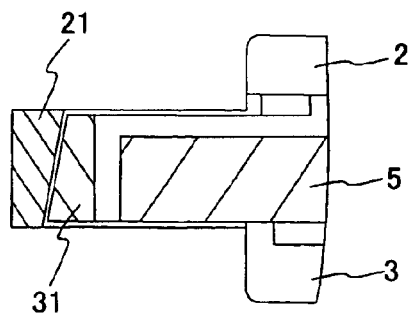
FIG. 1C shows a magnified view illustrating a portion A' shown in FIG. 1B.

As shown in FIGS. 1B and 1C, the bridges 21, 31 are formed so that the bridge 21 is arranged in an overlapped manner at the outside of the bridge 31 in the state in which the disk cartridge 1 is closed. That is, the bridge 21 and the bridge 31 are provided on the upper case 2 and the lowercase 3 at such positions that the outer surface of the bridge 31 is overlapped with the inner surface of the bridge 21. The inner surface and the outer surface are formed to have an identical angle of inclination. Accordingly, the disk cartridge 1 can be opened/closed without causing any interference between the bridge 21 and the bridge 31. As shown in FIGS. 2A–2B, the bridges 21, 31 are formed to be thinner than the thicknesses of the upper case 2 and the lowercase 3 respectively. As shown in FIG. 1A, flat sections 63, which extend in the direction perpendicular to the central plane AX, are formed at the joining portion between the bridge 21 and the upper case 2 and at the joining portion between the bridge 31 and the lowercase 3.

Next, an explanation will be made about an opening/ closing mechanism of the disk cartridge 1 with reference to FIGS. 2A–2B and 3A–3D. As shown in FIG. 2A, fastening sections 23 are provided at two positions on the outer circumference of the upper case 2 in the vicinity of the bridge 21 so that the fastening sections 23 are symmetrical in relation to the plane AX, that is, the fastening sections 23 are symmetrical to a line which passes through the center X of the disk cartridge 1 and a center of the hinge 7. As shown in FIG. 2B, locking elastic tabs 33 are provided at two positions on the outer circumference of the lowercase 3 in the vicinity of the bridge 31 so that the locking elastic tabs 33 are symmetrical in relation to the plane AX. The locking elastic tabs 33 are formed at such positions that they are engaged with the fastening sections 23 when the upper case 2 and the lowercase 3 are overlapped with each other by the aid of the hinge. When the engaging sections are provided at the two positions, then the upper case 2 and the lowercase 3 are reliably fixed, and the disk cartridge is more effectively prevented from any erroneous opening which would be otherwise caused when any impact or shock is applied from the outside. It is enough that the engaging sections are fanned on the same plane as the contour surface of the disk cartridge 1, or the engaging sections are formed inside the contour surface.

Figure 3A:
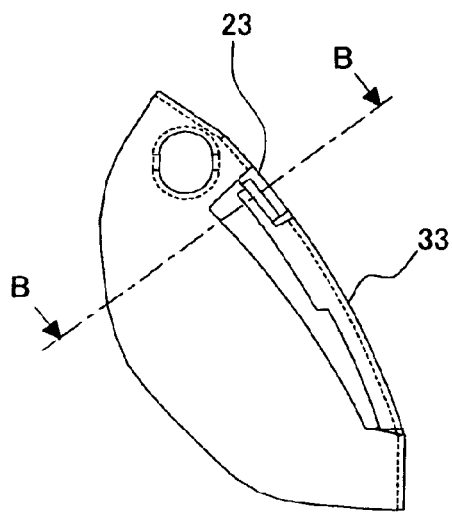
FIGS. 3A and 3B show magnified views illustrating those disposed in the vicinity of an engaging section of the disk cartridge.
Figure 3B:
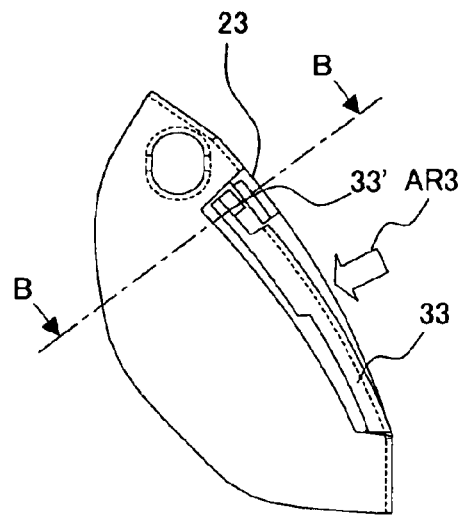
Figure 3C:
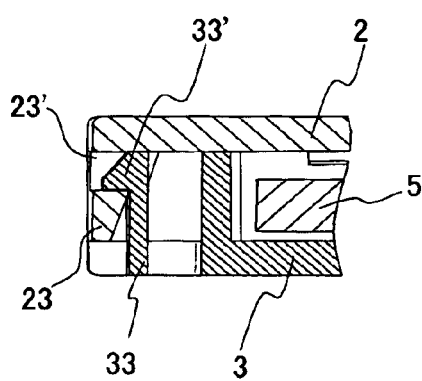
FIGS. 3C and 3D show sectional views taken along lines B—B corresponding to FIGS. 3A and 3B respectively.
Figure 3D:
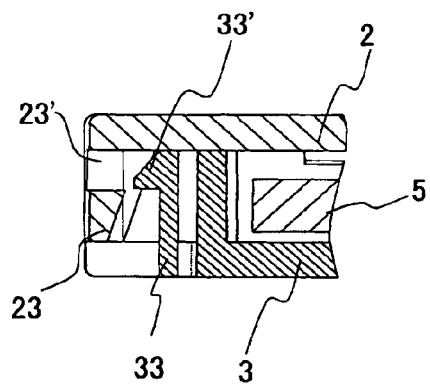

As shown in FIGS. 3A–3D, the fastening section 23 is an arm like a cantilever spring extending along the outer circumference of the upper case 2. A hole 23' is fanned through the arm. The locking elastic tab 33 is also an arm like a cantilever spring extending along the outer circumference of the lowercase 3. A projection 33', which is fitted to the hole 23', is formed at the tip of the arm. When the upper case 2 and the lowercase 3 are overlapped with each other by the aid of the hinge, i.e., in the state in which the disk cartridge 1 is closed, the projection 33' of the locking elastic tab 33 is fitted to the hole 23' of the fastening section 23 as shown in FIGS. 3A and 3C. Accordingly, the closed state of the disk cartridge 1 is maintained. On the other hand, as shown in FIGS. 3B and 3D, when the disk cartridge 1 is opened, the locking elastic tab 33 is pressed in the direction of the arrow AR3. Accordingly, the elastic tab 33 is elastically deformed about the support point of the base portion, and the projection 33' is disengaged from the hole 23' of the fastening section 23. Accordingly, the upper case 2 and the lowercase 3 are released from the engagement. The projection 33' and the fastening section 23 are machined to have tapered configurations so that the portions, which firstly make the contact with each other, are spread toward the outer surfaces of the cases respectively. Accordingly, when the disk cartridge I is closed, the projection 33' slides on the inner wall of the fastening section 23, making it easy to fit the projection 33' to the hole 23'. Once the projection 33' is fitted to the hole 23', the projection 33' cannot be disengaged from the hole 23' unless the elastic tab 33 is urged as shown in FIG. 3B. In this state, the upper arm and the lower arm are locked to one another.

Accommodation/Removal of Disk in/from Disk Cartridge

Figure 4A:
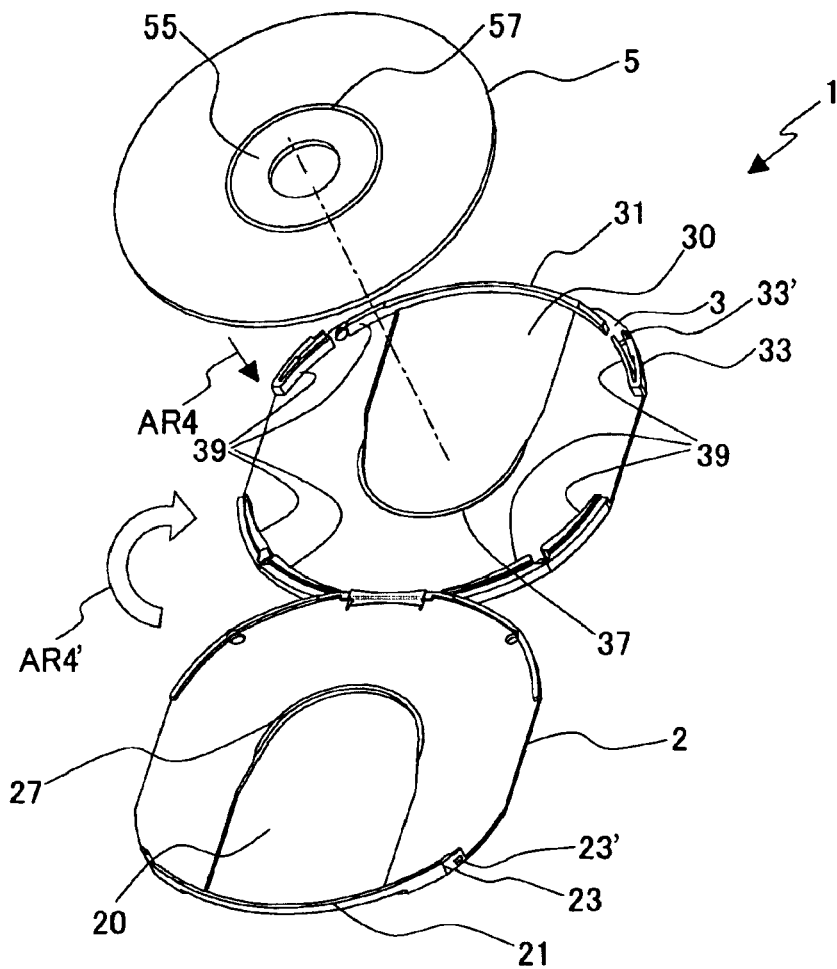
FIGS. 4A and 4B show situations in which a disk is accommodated in the disk cartridge according to the embodiment of the present invention.
Figure 4B:
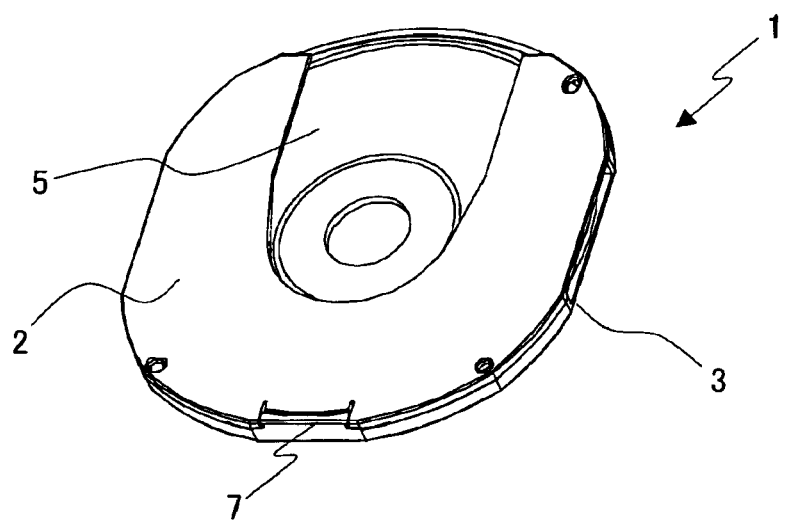

Next, an explanation will be made with reference to FIGS. 4A–4B and 5A–5C about the accommodation and the removal of the disk 5 in/from the disk cartridge 1. FIG. 4A shows a situation to accommodate the disk 5 in a state in which the upper case 2 and the lowercase 3 of the disk cartridge 1 are open. The disk 5 having a stack-ring 57 which defines an unrecordable area 55 is placed on the lowercase 3 (arrow AR4) while the outer circumferential edge of the disk 5 is guided by the bridge 31 which is formed on the lowercase 3 and inner wall portions of ribs 39 on which the locking elastic tabs 33 and other components are formed. Subsequently, the upper case 2 is overlapped on the lowercase 3 while rotating the upper case 2 in the direction of the arrow AR4' about the rotary shaft of the hinge 7. As described above, when the projections 33' of the locking elastic tabs 33 of the lowercase 3 are engaged with the holes 23' of the fastening sections 23 of the upper case 2, the disk cartridge 1 is in the closed state. Accordingly, as shown in FIG. 4B, the disk 5 is accommodated in the disk cartridge 1. In the closed state, the stack-ring 57 is exposed through the openings 20 and 30, since the openings 20 and 30 have the semicircular portions each of which has a larger diameter than that of the stack-ring 57 (as shown in FIG. 1A).

Figure 5A:
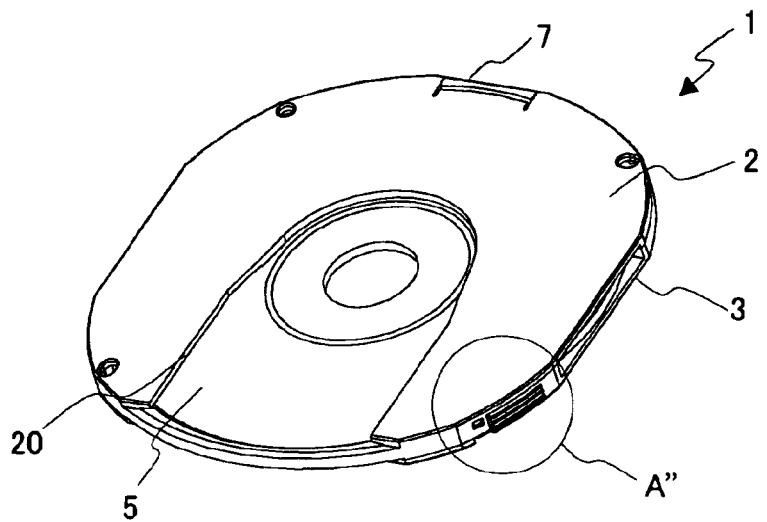
FIGS. 5A, 5B and 5C show situations in which the disk is removed from the disk cartridge according to the embodiment of the present invention.
Figure 5B:
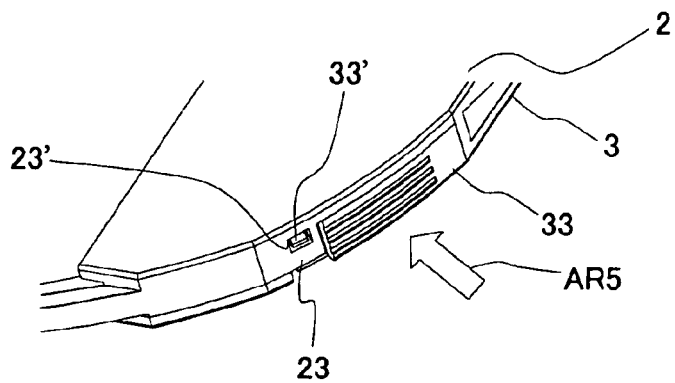
Figure 5C:
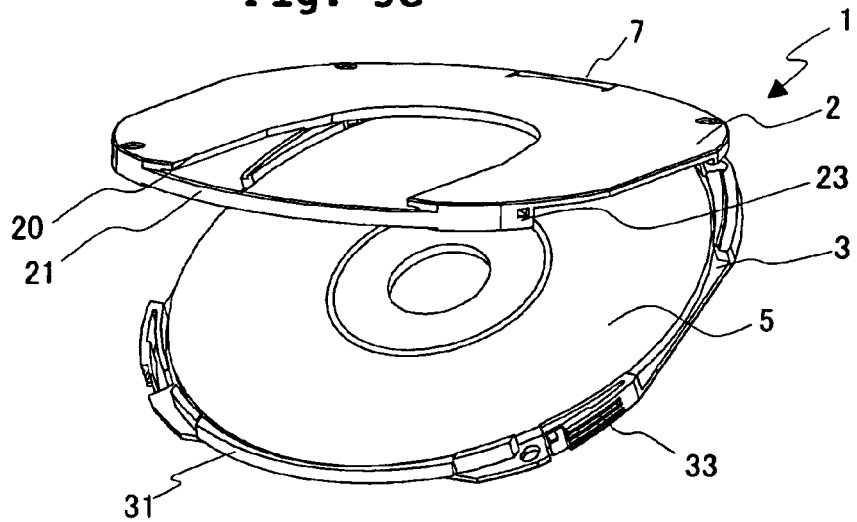

When the disk 5 is removed from the cartridge 1, the locking elastic tabs 33 of the disk cartridge 1 in which the disk 5 is accommodated are pressed in the direction of the arrow AR5 as the inward direction of the disk cartridge 1 as shown in FIG. 5A. Accordingly, the projections 33' of the lower case 3, which have been engaged with the fastening sections 23 of the upper case 2 as described above, are moved in the direction toward the center of the disk cartridge. The projections 33' are disengaged from the holes 23' of the fastening sections 23, and the upper case 2 and the lower case 3 are released from the engagement. Subsequently, the upper case 2 is rotated about a base point of the hinge 7 to disengage it from the lower case 3 so that the disk cartridge 1 is open. In this state, the disk 5, which has been accommodated in the disk cartridge 1, can be removed with ease.

Figure 6:
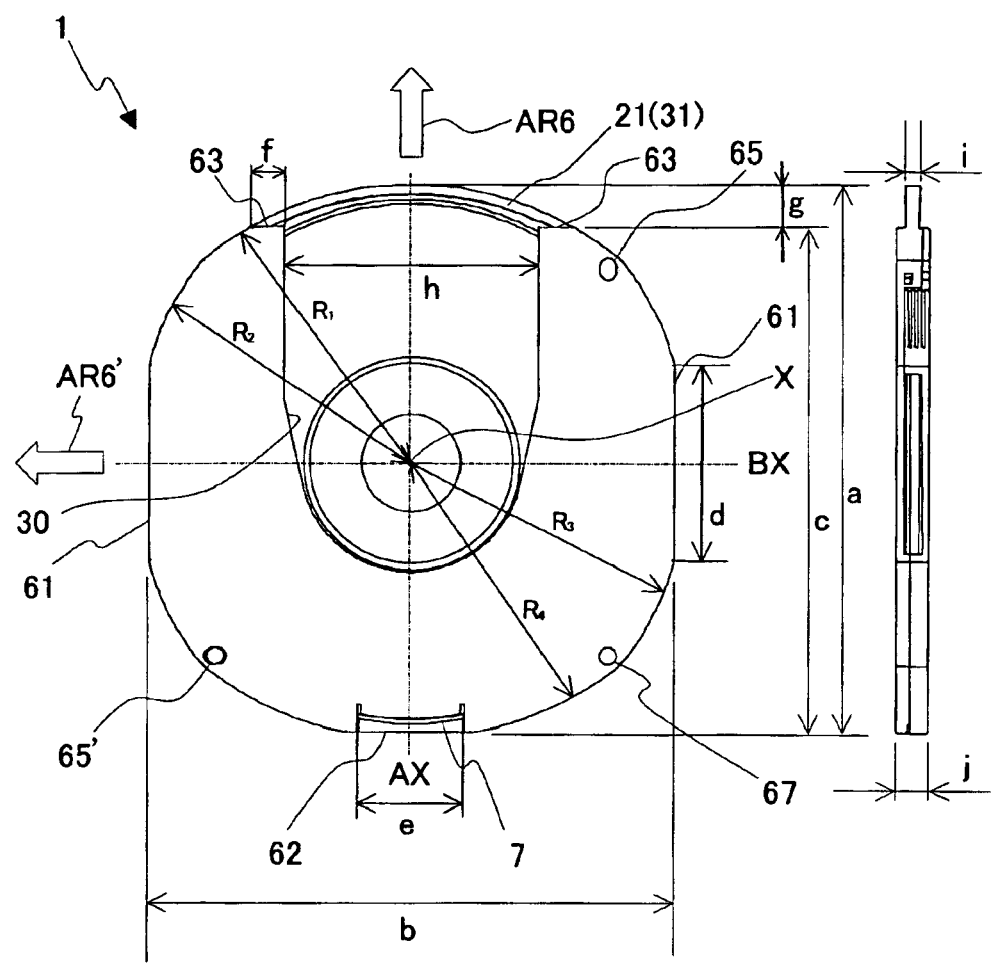
FIG. 6 is illustrative of the explanation in relation to the insertion of the disk cartridge according to the embodiment of the present invention into an information-recording/reproducing apparatus.
Figure 7:
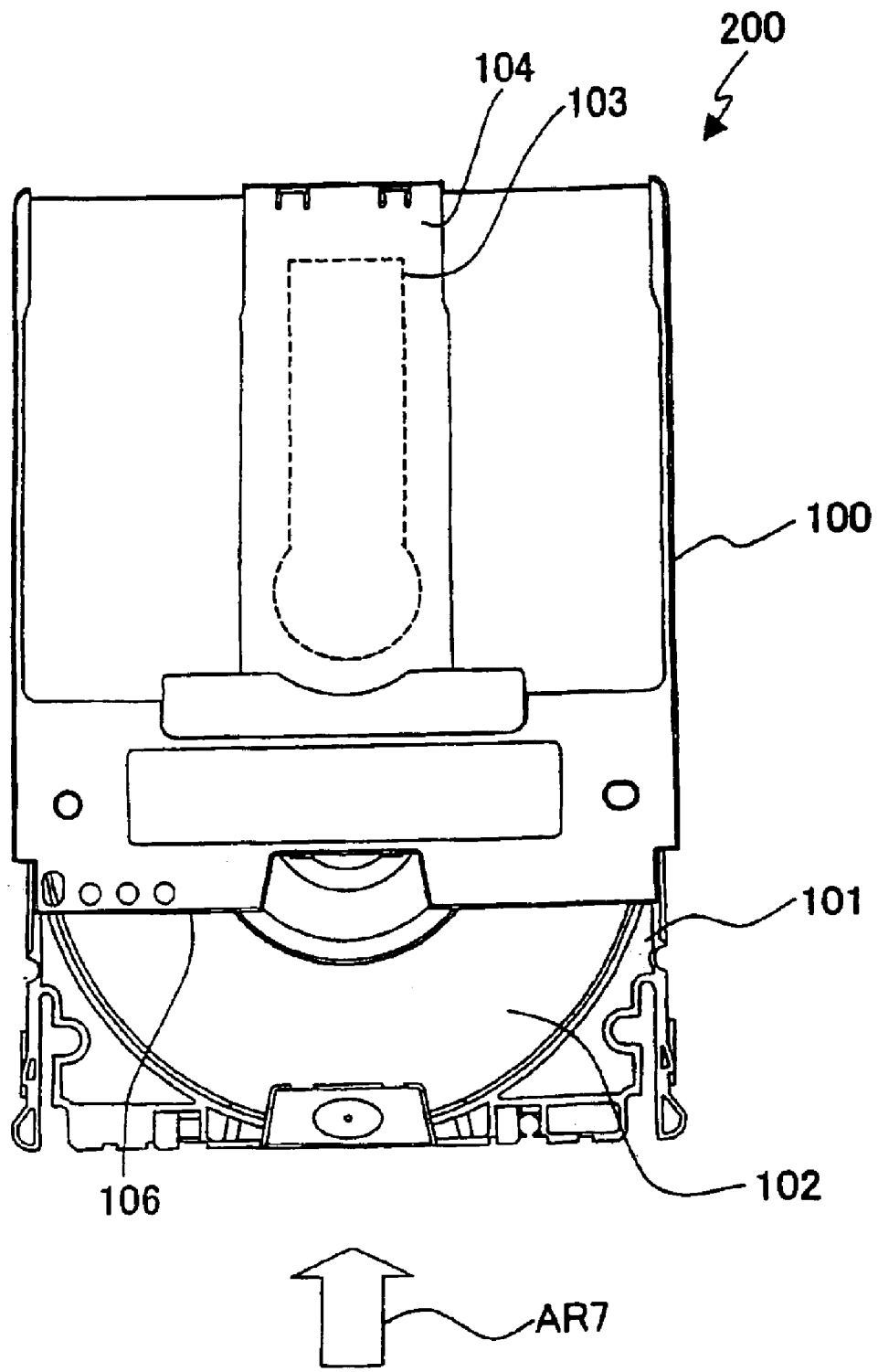
FIG. 7 shows a conventional disk cartridge for an information-recording medium.

Insertion of Disk Cartridge into Information-Recording/Reproducing Apparatus Next, an explanation will be made with reference to FIG. 6 about the insertion of the disk cartridge 1 into the information-recording/reproducing apparatus. The direction, in which the disk cartridge 1 is inserted, can be changed in conformity with the information-recording/reproducing apparatus to be used. As shown in FIG. 6, the flat sections 61, which are parallel to the central plane AX, are formed on the outer circumference of the disk cartridge 1. When the disk cartridge 1 is inserted into the unillustrated information-recording/reproducing apparatus from the side on which the bridges 21, 31 are formed (in the direction of the arrow AR6), the flat sections 61 function as guides for inserting the disk cartridge 1. Accordingly, the disk cartridge 1 can be reliably inserted into the information-recording/reproducing apparatus. Further, the flat sections 62, 63 are formed in the vicinity of the hinge 7 of the disk cartridge 1 and in the vicinity of the joining portions of the bridges 21, 31 respectively. The flat sections 62, 63 are formed so that they are parallel to the plane BX which is perpendicular to the plane AX and which passes through the center X of the disk cartridge 1. When the disk cartridge 1 is inserted into the information-recording/reproducing apparatus in the certain direction of the plane BX (in the direction of the arrow AR6'), the flat sections 62, 63 can be used as guides.

The disk cartridge 1 in this embodiment was formed so that the entire length "a" of the disk cartridge in the direction along the plane AX was 85.0 mm, the entire length of the disk cartridge in the direction along the plane BX, i.e., the width "b" between the flat sections 61 was 80.5 mm, and the length "c" between the hinge 7 and the flat sections 63 in the direction along the plane AX was 78.5 mm. The disk cartridge 1 is substantially circular. In order to provide the fastening sections (23) and the locking elastic tabs (33) for the disk cartridge 1 as described above, those disposed in the vicinity of the bridge 21 and those disposed in the vicinity of the flat section 61 are formed to have different radii of curvature. The disk cartridge 1 was formed so that the radius of curvature $R_1$ of the outer circumference of the disk cartridge at the bridge 21 and in the vicinity thereof and the radius of curvature $R_4$ of the outer circumference of the disk cartridge in the vicinity of the hinge 7 were 49.7 mm respectively, and the radii of curvature $R_2$, $R_3$ of the outer circumference of the disk cartridge in the vicinity of the flat sections 61 were 41.6 mm respectively. The disk cartridge 1 was formed so that the length "d" of the flat section 61 in the direction along the plane AX was 29.5 mm, the length "e" of the flat section 62 in the direction along the plane BX was 19.8 mm, the length "f" of the flat section 63 in the direction along the plane BX was 4.9 mm, and the width "g" of the bridge 21 in the in-plane direction was 6.6 mm. The flat section 61 is formed to have the length "d" which has a ratio of 34.7% with respect to the length "a" of the disk cartridge 1 in the direction along the plane AX. In this embodiment, it is preferable that the disk cartridge is formed so that the ratio (d/a) is within a range of 30 to 40%. More preferably, the ratio is within a range of 30 to 40% in order to miniaturize the disk cartridge while utilizing the flat sections 61 as the guides.

The disk cartridge 1 was formed so that the opening width "h" of the opening 30 of the disk cartridge 1 in the direction along the plane BX was 39.2 mm. The thickness "i" of the bridge 21 (or 31) is 2.4 mm which is formed to be thin, i.e., about a half of the thickness "j"=5.2 mm of the disk cartridge 1. When the bridge portion is formed to have the thickness which is thinner than the thickness of the disk cartridge, it is possible to avoid the erroneous insertion of the disk cartridge 1 into the information-recording/reproducing apparatus. Specifically, the shape of the deep portion or the insertion port of the information-recording/reproducing apparatus for inserting the disk cartridge is structured to have such a size that only the thickness of the bridge 21 (or 31) is receivable. Accordingly, even if it is intended to insert the disk cartridge 1 reversely front to back or left to right, then it is impossible to install the disk cartridge at the final installation position, or it is impossible to insert the disk cartridge itself into the insertion port. Thus, it is possible to reliably avoid the erroneous insertion. Considering the purpose to avoid the erroneous insertion as described above and the mechanical strength of the bridge, it is preferable that the thickness of the bridge is adjusted to be 30 to 60% with respect to the maximum thickness of the disk cartridge 1. When the disk cartridge 1 of this embodiment is inserted into the unillustrated information-recording/reproducing apparatus, the recording and reproducing head of the information-recording/reproducing apparatus is inserted from the side of the bridge 21 (or 31).

As shown in FIG. 6, slotted hole-shaped alignment holes 65, 65' and a perfect circular location hole 67 may be provided on the surface of the disk cartridge 1 in the vicinity of the outer circumference. The alignment hole 65 is formed so that the long axis is arranged in the direction of the plane AX. The alignment hole 65' is formed so that the long axis is arranged in the direction of the plane BX. The alignment holes 65, 65' and the location hole 67 are provided in order to position the disk cartridge 1 in the information-recording/reproducing apparatus when the disk cartridge 1 is inserted into the information-recording/reproducing apparatus. When the disk cartridge 1 is inserted into the information-recording/reproducing apparatus, reference pins, which are provided on the information-recording/reproducing apparatus and which correspond to the alignment holes 65, 65' and the location hole 67 respectively, are fitted to the alignment holes 65, 65' and the location hole 67. Accordingly, the disk cartridge 1 is positioned.

In the embodiment described above, the shape of the disk cartridge is substantially circular. However, it is enough that a part of the contour of the disk cartridge has a curved portion formed substantially along the outer circumferential shape of the disk. For example, a part of the contour of the disk cartridge may be sector-shaped or semicircular.

In the embodiment described above, the upper case 2 and the lower case 3, which are formed separately, are connected to one another by the aid of the hinge 7. However, a hinge section may be previously formed by means of the integrated formation together with the upper case and the lower case. Accordingly, the number of part is one, in which it is possible to simplify the production steps, and it is possible to omit the assembling steps.

In the embodiment described above, the openings are provided for both of the upper case 2 and the lower case 3. However, in the case of a medium on which information is recorded and reproduced only from one surface side of the disk, the opening may be provided on only any one of the surfaces of the upper case 2 and the lower case 3.

In the embodiment described above, the engaging sections for engaging the upper case 2 and the lower case 3 are provided in the vicinity of the bridge at the positions opposed to the hinge. However, the position of the engaging section is arbitrary provided that the engaging section is not released from the engagement with ease. The mechanism of the engaging section is not limited to the arm type structure as described above, and it is possible to adopt various forms including, for example, a pin and a hole. The number of engaging section or engaging sections is not limited to two. The number may be one, or two or more, for example, three or four. When the number of engaging section is one, for example, an engaging section may be provided for the bridge, or a rotary shaft may be provided in the vicinity of the both ends of the bridge, and an engaging section may be provided on a side opposite to the bridge.

The disk cartridge of the present invention is formed to be substantially circular, and it has the simple structure having neither shutter nor disk holder. Therefore, the disk cartridge of the present invention is compact, and the number of parts is small. It is possible to simplify the production steps, and it is possible to lower the production cost. Further, it is easy to accommodate the disk in the disk cartridge. Therefore, it is possible to eliminate any danger concerning the handling inconvenience.

The disk cartridge of the present invention is assembled by the hinge and the engaging sections disposed at the two positions. The cartridge is suppressed for the opening which would be otherwise caused by any external impact. Further, the cartridge of the present invention is the thin plate formed product composed of synthetic resin such as polycarbonate. Therefore, it is possible to avoid the deformation including, for example, warpage and floating of the end surface.

What is claimed is:

1. A disk cartridge which accommodates an information-recording disk, the disk cartridge comprising:
    an upper case which has a first engaging section;
    a lower case which has a second engaging section engageable with the first engaging section and which defines a disk-accommodating section when the lower case overlaps with the upper case; and
    a movable section which is provided for at least one of the upper case and the lower case and which rotates the upper case relative to the lower case,
    wherein each of the upper case and the lower case is formed to be substantially circular while having at least a pair of parallel flat sections disposed at opposing positions on an outer circumference, an opening is provided on at least one of surfaces of the upper case and the lower case, and at least one of the upper case and the lower case has a plurality of ribs which surround the disk and which are formed by substantially concentric cylindrical surfaces, and the first engaging section and the second engaging section formed outside the ribs.

2. The disk cartridge according to claim 1, wherein the opening is open so that an information-recording surface and a central portion of the information-recording disk are exposed.

3. The disk cartridge according to claim 1, further comprising a bridge which is provided at an end of each of the upper case and the lower case on a side on which the opening is formed.

4. The disk cartridge according to claim 3, wherein the bridge is formed to have a thickness which is thinner than a thickness of the disk cartridge.

5. The disk cartridge according to claim 1, wherein the upper case, the lower case, and the movable section are formed by integrated formation.

6. The disk cartridge according to claim 1, further comprising the information-recording disk accommodated in the disk cartridge.

7. A disk cartridge which accommodates an information-recording disk, the disk cartridge comprising:
    an upper case which has a first engaging section;
    a lower case which has a second engaging section engageable with the first engaging section and which defines a disk-accommodating section when the lower case overlaps with the upper case; and
    a movable section which is provided for at least one of the upper case and the lower case and which rotates the upper case relative to the lower case,
    wherein each of the upper case and the lower case is formed to be substantially circular while having at least a pair of parallel flat sections disposed at opposing positions on an outer circumference, an opening is provided on at least one of surfaces of the upper case and the lower case, and the first engaging section and the second engaging section are provided on the same plane as an outer circumferential surface of the disk cartridge, inside the outer circumferential surface.

8. The disk cartridge according to claim 7, wherein the opening is open so that an information-recording surface and a central portion of the information-recording disk are exposed.

9. The disk cartridge according to claim 7, further comprising a bridge which is provided at an end of each of the upper case and the lower case on a side on which the opening is formed.

10. The disk cartridge according to claim 9, wherein the bridge is formed to have a thickness which is thinner than a thickness of the disk cartridge.

11. The disk cartridge according to claim 7, wherein the upper case, the lower case, and the movable section are formed by integrated formation.

12. The disk cartridge according to claim 7, further comprising the information-recording disk accommodated in the disk cartridge.

13. A disk cartridge which accommodates an information-recording disk, the disk cartridge comprising:
    an upper case which has a first engaging section;
    a lower case which has a second engaging section engageable with the first engaging section and which defines a disk-accommodating section when the lower case overlaps with the upper case; and
    a movable section which is provided for at least one of the upper case and the lower case and which rotates the upper case relative to the lower case,
    wherein each of the upper case and the lower case is formed to be substantially circular while having at least a pair of parallel flat sections disposed at opposing positions on an outer circumference, an opening is provided on at least one of surfaces of the upper case and the lower case, and the first engaging section and the second engaging section are provided on a side opposite to the movable section in relation to a center of the disk cartridge.

14. The disk cartridge according to claim 13, wherein two pairs of first engaging sections and second engaging sections are provided.

15. The disk cartridge according to claim 14, wherein the two pairs of the first engaging sections and the second engaging sections are provided substantially symmetrical to a line which passes through the center of the disk cartridge and the movable section.

16. The disk cartridge according to claim 13, wherein the opening is open so that an information-recording surface and a central portion of the information-recording disk are exposed.

17. The disk cartridge according to claim 13, further comprising a bridge which is provided at an end of each of the upper case and the lower case on a side on which the opening is formed.

18. The disk cartridge according to claim 17, wherein the bridge is formed to have a thickness which is thinner than a thickness of the disk cartridge.

19. The disk cartridge according to claim 13, wherein the upper case, the lower case, and the movable section are formed by integrated formation.

20. The disk cartridge according to claim 13, further comprising the information-recording disk accommodated in the disk cartridge.

* * * * *